United States Patent Office 3,221,015
Patented Nov. 30, 1965

3,221,015
3,8-DIAZABICYCLO-[3,2,1]-OCTANES AND PROCESS FOR PREPARING SAME
Giorgio Cignarella, Milan, Italy, assignor to Lepetit S.p.A., Milan, Italy
No Drawing. Filed Apr. 19, 1961, Ser. No. 104,016
Claims priority, application Great Britain, Feb. 17, 1960, 5,642/60; June 13, 1960, 20,695/60
18 Claims. (Cl. 260—268)

This is a continuation-in-part of abandoned application Serial No. 86,854, filed February 3, 1961.

This invention relates to new heterocyclic compounds and process for preparing the same.

It is also concerned with their non-toxic mineral acid addition salts as well as with the process for their preparation.

More particularly, the compounds of the invention are 3,8-diazabicyclo-[3,2,1]-octanes of the formula:

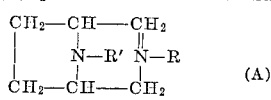
(A)

wherein R represents hydrogen, lower alkyl, aryl and aralkyl, R' represents hydrogen, or methyl.

Such compounds have been found to be pharmacologically active as diuretics and on the vegetative and central nervous system. For instance, 3-benzyl-8-methyl-3-8-diazabicyclo-[3,2,1]-octane methiodide has analgetic properties and increases in mice the stimulus threshold (expressed in mm. Hg as pressure applied to the excited member, according to the Randall and Selitto procedure) of +23 at the doses of 2 mg./kg. and of +48 at 5 mg./kg.

3 - p - chlorobenzhydryl - 8 - methyl - 3,8 - diazabicyclo-[3,2,1]-octane causes an increase of urinary excretion of over 70 percent at the dose of 25 mg./kg. and acts also as natriuretic increasing sodium excretion of 40 percent at 10 mg./kg., about 100 percent of 25 mg./kg. and over 160 percent at 50 mg./kg. in mice. Compound 3-o-chlorobenzhydryl - 8 - methyl - 3,8 - diazabicyclo-[3,2,1]-octane at the dose of 0.2 γ/cc. decreases the acetylcholine response by 60 percent in rats and acts moreover as an antihistominic changing by about −30 percent the response to histamine in guinea pigs. 3-cinnamyl-8-methyl-3,8-diazabicyclo-[3,2,1]-octane increases urinary excretion by about 170 percent at 10 mg./kg. and sodium excretion by over 120 percent at 10 mg./kg. and by 180 percent at 25 mg./kg. in mice.

The process of the invention consists in adding an ether solution of 3,8-diazabicyclo-[3,2,1]-octane-2,4-dione of the formula:

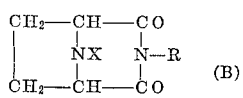
(B)

wherein R is as defined above and X represents a member of the group consisting of hydrogen and carbobenzoxy, to a suspension of lithium aluminium hydride in an anhydrous inert organic solvent, such as ethyl ether, or dioxane tetrahydrofuran at about 0° C. and refluxing the mixture at the end of the addition to complete reaction; then treating with water, filtering, concentrating to dryness and distilling the resulting product.

The compounds B are also new and have proved of great utility as analgetics and diuretics. 3-phenyl-8-carbobenzoxy-3-8-diazabicyclo-[3,2,1]-octane-2,4-dione has proved to be an effective diuretic and saluretic agent showing the following precentage changes in urinary and sodium excretion:

At 10 mg./kg. _____ +24    +10
   25 mg./kg. _____ +95    +125
   50 mg./kg. _____ +143   +178 and possesses moreover analgetic properties as illustrated by the following values of its pain-threshold-raising activity:

Mg./kg. i.p.:                              Percent increase
   25 _____ +40
   35 _____ +67
   50 _____ +208

The fundamental compound of the class, i.e. 3,8-diazabicyclo-[3,2,1]-octane (A, R=R'=H) can be prepared from a compound selected from among the group represented by the formula B hereinbefore and carrying on one of the two nitrogens present in the molecula a group which can easily be split off by hydrogenolysis, such as benzyl or carbobenzoxy.

The starting compounds 3,8-diazabicyclo-[3,2,1]-octane-2,4-diones (III) are also new and can be produced by adding to the internal anhydride of a N-substituted-pyrrolidine-2,5-dicarboxylic acid (I) an excess of an amine of the formula:

$$NH_2R$$

wherein R has the above significance in an inert anhydrous organic solvent and refluxing the mixture till reaction is complete, then refluxing the crude monoamide (II), obtained by evaporating the solvent to dryness, with acetic anhydride, removing the solvent, heating in vacuo to 130°–140° to produce the 2,4-dione (III). The latter is then taken up with ethyl ether, and reduced, as with lithium aluminum hydride, to yield IV. The reaction scheme of the process is as follows:

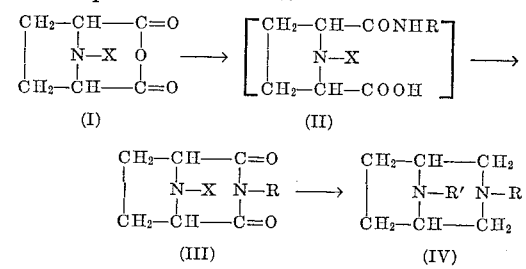

The internal anhydride of the carbobenzoxypyrrolidine-2,5-dicarboxylic acid (I) is prepared by hydrogenating 2,5-dicarbethoxy-N-benzylpyrrolidine under a pressure of about 20 atmospheres, using palladium on charcoal catalyst, hydrolysing the 2,5-dicarbethoxypyrrolidine (VI) thus obtained by refluxing the aqueous suspension separating the acid (VII) by concentrating the clear resulting solution and then treating it with the appropriate reagent, such as benzyl chlorocarbonate.

The resulting N-substituted pyrrolidine-2,5-dicarboxylic acid (VIII) is refluxed with acetic anhydride to give the corresponding internal anhydride I.

The reaction scheme is as follows:

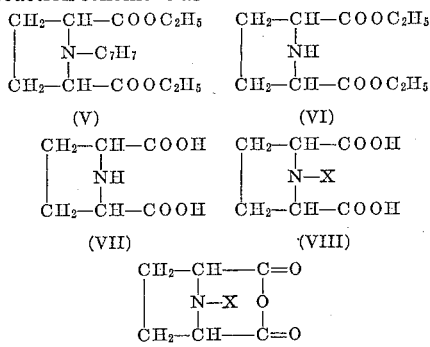

Obviously when X in compound VII is H compound VII is directly converted to I.

Compound A in which R'=H can be also obtained from the corresponding compounds B in which X= carbobenzoxy by previously splitting off the carbobenzoxy group by means of hydrogenolysis caused by catalytically activated hydrogen, or from compound VI, i.e. 2,5-dicarbethoxypyrrolidine, by reacting it with an amine of the general formula

wherein R is as defined above in an inert anhydrous organic solvent to give 2-carbethoxy-5-(N-substituted)-carbamyl-pyrrolidine and causing cyclisation by mild warming.

Among the possibilities for the preparation of these compounds, the preferred method is the latter, which leads to the desired products through very few steps according to the following scheme:

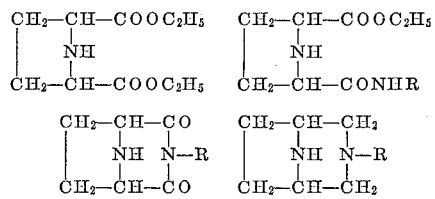

The following examples illustrate the invention:

EXAMPLE I

2,5-dicarbethoxypyrrolidine

A solution of 60 g. 2,5-dicarbethoxy-N-benzylpyrrolidine, obtained according to the method of J. V. Braun, J. Seaman (Ber. 56, 1842) is hydrogenated at 40° C. under 20 atm. in absolute alcohol in the presence of 3 g. of 10% palladium on charcoal as catalyst. The reduction is complete in about 2 hours. The catalyst is filtered off, the alcohol evaporated and the residue distilled in vacuo; yield 38 g. (91%), B.P. 95–96 C./0.3 mm.

Pyrrolidine-2,5-dicarboxylic acid

A suspension of 200 g. of 2,5-dicarbethoxypyrrolidine in 8 l. $H_2O$ is refluxed for 25–30 hours.

The obtained clear solution is evaporated to about 400 ml. and an abundant crystalline product is obtained which is then filtered off and dried in an oven; a total yield of 110 g. (74.5%) M.P. 260–61°.

N-carbobenzoxypyrrolidine-2,5-dicarboxylic acid

To a solution of 67 g. of pyrrolidine 2,5-dicarboxylic acid in 420 ml. 2 N NaOH, cooled to 8–10° C. are added with vigorous stirring 73 g. of benzyl chlorocarbonate together with 210 ml. 2 N NaOH over a period of 30 minutes. The solution is stirred for 2 hours at room temperature, then it is extracted with ethyl ether and the aqueous phase is acidified with concentrated HCl. An oil separates which is extracted with ethyl ether and the evaporated ether extract gives an oil that solidifies in vacuo in a short time. Yield 86.5 g. (64.5%), M.P. 125–127° C.

N-carbobenzoxypyrrolidine-2,5-dicarboxylic acid anhydride

A solution of 79 g. of N-carbobenzoxypyrrolidine-2,5-dicarboxylic acid in 360 ml. acetic anhydride is refluxed for 1 hour, then it is evaporated to dryness; the residue is heated for 1 hour at 14° C. under 1 mm. pressure. The residue is then cooled, taken up in 100 ml. warm ethyl ether which dissolves the coloured impurities and the anhydride is collected by filtering in vacuo. Yield 58.1 g. (78%), M.P. 166–168° C.

8-carbobenzoxy-3,8-diazabicyclo-[3,2,1]-octane-2,4-dione

To a solution of 27.5 g. of N-carbobenzoxypyrrolidine-2,5-dicarboxylic acid anhydride in 300 ml. of anhydrous benzene is added with cooling a solution of 1.9 g. $NH_3$ in 50 ml. of anhydrous benzene. The mixture is refluxed for 30 minutes and the solvent is removed in vacuo.

The resulting crude monoamide is refluxed with 5 portions of its weight of acetic anhydride for 1 hour. The mixture acetic acid-acetic anhydride is distilled in vacuo and heated for 1 hour at 130–140° C. under 1 mm. pressure till the reaction is complete. The residue is then taken up with 300 ml. ethyl ether and the insoluble portion is removed. After drying over $Na_2SO_4$ the solvent is removed and the product is purified by distillation. Yield 18 g. (66%), M.P. 125° C.

8-methyl-3,8-diazabicyclo-[3,2,1]-octane

An ether solution containing 27.4 g. of 8-carbobenzoxy-3,8-diazabycyclo-[3,2,1]-octane-2,4-dione is added dropwise with stirring to an ether suspension of 5.7 g. of $LiAlH_4$ and cooling to about 0–5° C. After the addition, the temperature is adjusted to room temperature and the solution is mildly refluxed for 3–4 hours. After cooling to −5° C. the reaction mixture is decomposed by cautious addition of 20 ml. of $H_2O$ under stirring. The solution is kept stirred for 1 hour at room temperature, filtered and the hydrates are thoroughly washed with ether. The ether extracts are collected and dried over $Na_2SO_4$. The solvent is evaporated, the benzyl alcohol is removed and the amine is distilled; B.P. 163–165° C. By the addition of either 1 mole of methyliodide or hydrochloric acid or a solution of picric acid, the methyliodide (M.P. 225–227° C.), the dihydrochloride (M.P. 314–315° C.) and the dipicrate (M.P. 252–254° C.) of the amine were obtained respectively.

EXAMPLE 2

3-methyl-8-carbobenzoxy-3,8-diazabicyclo-[3,2,1]-octane-2,4-dione

To a solution of 27.5 g. N-carbobenzoxypyrrolidine-2,5-dicarboxylic acid anhydride in 300 ml. anhydrous benzol 3.42 g. of methylamine are added with cooling. The solution is refluxed for 30 minutes, the solvent is removed in vacuo and the obtained crude monoamide is refluxed with 5 portions of its weight of acetic anhydride for 1 hour. The main solvent is distilled in vacuo and the reaction is completed by heating at 130–140° C. for 1 hour under 1 mm. pressure. The residue is taken up in ethyl ether and the insoluble portion is removed by filtration. The extract is dried over $Na_2SO_4$, the solvent is evaporated and the residue is purified by distillation. Yield 18.8 g. (65%), B.P. 170–172°C./0.3 mm.

3-methyl-8-methyl-3,8-diazabicyclo[3,2,1]octane

An ether solution containing 25.6 g. 3-methyl-8-carbobenzoxy-3,8-diazabicyclo-[3,2,1]-octane-2,4-dione is added with stirring to a suspension of 5.7 g. $LiAlH_4$ in ethyl ether with cooling to 0–5° C. At the end of the addition the temperature is adjusted to room temperature, the solution is refluxed for 3–4 hours, cooled to −5° C. and decomposed under stirring by cautious addition of 20 ml. water.

The solution is stirred for 1 hour at room temperature and filtered; the hydrates are thoroughly washed with ethyl ether and the ether extracts are collected and dried over $Na_2SO_4$. The solvent is evaporated, the amine separated by removing the benzyl alcohol and distilled; B.P. 50–52° C./8 mm. Yield 7.3 g. (52%). By addition of either 1 mole of methyliodide or hydrochloric acid or a solution of picric acid, the methyliodide (M.P. 290–292° C.), the dihydrochloride (M.P. 314–315° C.) and the dipicrate (M.P. 242–245° C.) were obtained respectively.

EXAMPLE 3

*3-butyl-8-carbobenzoxy-3,8-diazabicyclo-[3,2,1]octane-2,4-dione*

To a solution of 27.5 g. of N-carbobenzoxypyrrolidine 2,5-dicarboxylic acid anhydride in 300 ml. anhydrous benzol, are added with cooling 8.0 g. of butylamine. The mixture is refluxed for 30 minutes, the solvent is removed in vacuo and the resulting crude monoamide is refluxed for 1 hour with 5 portions of its weight of acetic anhydride. The acetic acid-acetic anhydride mixture is distilled in vacuo and the reaction is completed by heating for 1 hour at 130–140° under 1 mm. pressure. The residue is then taken up in 300 ml. ethyl ether and the insoluble portion is removed. After drying over $Na_2SO_4$ the solvent is distilled and the product purified by distillation. Yield 22.5 g. (68%); B.P. 192–194°/0.3 mm.

*3-butyl-8-methyl-3,8-diazabicyclo-[3,2,1]-octane*

An ether solution of 33.0 g. 5-butyl-8-carbobenzoxy-3,8-diazabicyclo-[3,2,1]-octane-2,4-dione is added dropwise with stirring to a suspension of 5.7 g. $LiAlH_4$ in diethyl ether with cooling at 0–5° C. At the end of the addition the temperature is adjusted to room temperature and the mixture is refluxed for 3–4 hours. It is then cooled to —5° C., decomposed by cautious addition with stirring of 20 ml. water, kept stirred for 1 hour at room temperature, filtered and the hydrates thoroughly washed with diethyl ether. The ether extracts are collected and dried over $Na_2SO_4$. As the boiling point is near to that of benzyl alcohol the separation is carried out by treating the ether solution with hydrochloric acid and isolating the product as the dihydrochloride, the base of which can be freed by making the solution alkaline with 50% KOH and extracting with diethyl ether. Yield 11.5 g.; B.P. 60–61° C./0.3 mm.

By addition of either 1 mole of methyliodide or hydrochloric acid or a solution of picric acid, the methyliodide (M.P. 218°–220°), the dihydrochloride (M.P. 245°–247°) and the dipicrate (M.P. 220°–222° C.) were obtained respectively.

EXAMPLES 4–8

The following compounds were prepared following the same procedure as in Examples 2–3:

| 3-Substituent | 8-Substituent | M.W. | B.P. | M.P., deg. |
|---|---|---|---|---|
| $C_6H_5$ | $CH_3$ | 202 | 105–108° C/0.2 mm | 45–47 |
| $CH_2CH=CH-C_6H_5$ | $CH_3$ | 242.35 | 120–130° C/0.6 mm | |
| p-Chloro-benzhydryl (hydrochloride) | $CH_3$ | 363.32 | | 176–179 |
| o-Chlorobenzhydryl (dihydrochloride) | $CH_3$ | 399.78 | | 283–287 |
| $C_6H_5CH_2$ | $CH_3$ | 289.248 | | 218–220 |

EXAMPLE 9

*3-benzyl-3,8-diazabicyclo-[3,2,1]-octane-2,4-dione*

Into a solution of 12 g. of 3-benzyl-8-carbobenzoxy-3,8-diazabicyclo-[3,2,1]-octane-2,4-dione (prepared as described in the preceding examples for 3-alkyl derivatives) in 600 ml. of 80% methanol and 6 ml. of acetic acid, containing 2 g. of 10% palladium on charcoal, a slow stream of hydrogen is bubbled with vigorous shaking until hydrogenation is complete, which requires about 3 hrs.

After filtration of the catalyst and neutralisation of the solution with $NaHCO_3$ the organic solvent is removed and the residue distilled in vacuo. Yield 4.65 g. (61%) of 3 - benzyl-3,8-diazabicyclo-[3,2,1]-octane-2,4-dione; B.P. 150–152° C./0.2 mm. Hg; M.P. 78° C. An elemental analysis of the product gave: C, 68.01 percent; H, 6.2 percent; N, 12.4 percent. Calcd. for $C_{13}H_{14}N_2O_2$: C, 67.82 percent; H, 6.1 percent; N, 12.2 percent.

*3-benzyl-3,8-diazabicyclo-[3,2,1]-octane*

Into a suspension of 3.5 g. of $LiAlH_4$ in 100 ml. of diethyl ether, 6.5 g. of 3-benzyl-3,8-diazabicyclo-[3,2,1]-octane-2,4-dione in 50 ml. of diethyl ether are added with stirring in about half an hour at 0° C. The mixture is then mildly refluxed for 5 hrs., cooled to —5° and filtered after addition of 10 ml. of water under stirring. The ether layer is then dried over $Na_2SO_4$, the organic solvent is removed and the residue distilled in vacuo. Yield 4.2 g. (74%), B.P. 95–97° C. An elemental analysis gave: C, 77.00 percent; H, 8.79 percent; N, 13.81 percent. Calcd. for $C_{13}H_{18}N_2$: C, 77.22 percent; H, 8.91 percent; N, 13.86 percent. The dihydrochloride has M.P. 145–148° C.; the dipicrate has M.P. 232–235° C.

EXAMPLE 10

*2-benzylcarbamyl-5-carbethoxy-pyrrolidine*

A mixture of 21.5 g. of 2,5-dicarbethoxypyrrolidine and 11.8 g. of benzylamine in 50 ml. of anhydrous xylene is refluxed for 24 hrs.; the main part of the organic solvent is removed, the 2,5-dibenzylcarbamyl-pyrrolidine that precipitates from the concentrated solution is filtered off, and after removing the solvent the residue is distilled in vacuo. Yield 20.2 g. (72.5%), B.P. 178–180° C./0.3 mm. An elemental analysis gave C, 65,38 percent; H, 7.19 percent; N, 10.33 percent. Calcd. for $C_{15}H_{20}N_3O_2$, C, 65.21 percent; H, 7.24 percent; N, 10.14 percent.

*3-benzyl-3,8-diazabicyclo-[3,2,1]-octane*

Into a suspension of 20 g. of $LiAlH_4$ in 300 ml. of anhydrous diethyl ether 49 g. of 2-benzylcarbamyl-5-carbethoxypyrrolidine in 300 ml. of anhydrous diethyl ether are added in about half an hour, with stirring at about 0° C.

The mixture is then refluxed for 8 hrs., cooled to 0–5° C., and 50 ml. of water are added. Stirring is continued at room temperature for 1 hour to complete the reaction. After filtration of inorganic products the ether layer is separated, dried over $Na_2SO_4$, the organic solvent is removed and the residue distilled. Yield 25.2 g. (70%), B.P. 100–105° C./0.4 mm. Hg. An elemental analysis gave C, 76.97 percent; H, 9.10 percent; N, 13.59 percent. Calcd. for $C_{13}H_{18}N_2$, C, 77.22 percent; H, 8.91 percent; N, 13.86 percent.

EXAMPLE 11

*3,8-diazabicyclo-[3,2,1]-octane*

In a sealed tube 50 g. of 3-benzyl-3,8-diazabicyclo-[3,2,1]-octane in 100 ml. of anhydrous ethyl alcohol are hydrogenated in the presence of 2 g. of 10% palladium on charcoal as a catalyst under 20 atmospheres and at 40° C. The reaction requires about one hour. The mixture is then cooled to room temperature, filtered, the organic solvent is removed and the residue is distilled under atmospheric pressure through a fractionating column. Yield 19.6 g. (71%) of 3,8-diazabicyclo-[3,2,1]-octane; B.P. 173–175° C. An elemental analysis gave: C, 64.24 percent; H, 11.01 percent. Calcd. for $C_6H_{12}N_2$: C, 64.28 percent; H, 10.71 percent. The dihydrochloride has M.P. 314–315° C.; the dipicrate has M.P. 248–250° C.

EXAMPLE 12

According to the procedure described in Example 9, also 3-phenyl-3,8-diazabicyclo-[3,2,1]-octane was prepared.

I claim:

1. A compound of the class consisting of a 3,8-diazabicyclo-[3,2,1]-octane of the formula:

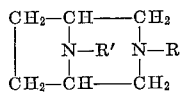

wherein R is a member of the class consisting of hydrogen, lower alkyl, phenyl, cinnamyl, benzyl and chlorobenzhydryl, R' is a member of the class consisting of hydrogen and methyl and its quaternary non-toxic addition salts.

2. 3,8-diazabicyclo-[3,2,1]-octane.
3. 8-methyl-3,8-diazabicyclo-[3,2,1]-octane.
4. 3,8-dimethyl-3,8-diazabicyclo[3,2,1]-octane.
5. 3-butyl-8-methyl-3,8-diazabicyclo-[3,2,1]-octane.
6. 3-benzyl-3,8-diazabicyclo-[3,2,1]-octane.
7. 3-phenyl-3,8-diazabicyclo-[3,2,1]-octane.
8. 3-phenyl-8-methyl-3,8-diazabicyclo-[3,2,1]-octane.
9. 3-benzyl-8-methyl-3,8-diazabicyclo-[3,2,1]-octane dihydrochloride.
10. 3-cinnamyl-8-methyl-3,8-diazabicyclo-[3,2,1]-octane.
11. 3-p-chlorobenzhydryl-8-methyl-3,8-diazabicyclo-[3,2,1]-octane hydrochloride.
12. 3-o-chlorobenzhydryl-8-methyl-3,8-diazabicyclo-[3,2,1]-octane dihydrochloride.
13. A process for preparing 3,8-diazabicyclo-[3,2,1]-octane-2,4-diones of the formula:

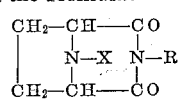

wherein X is a member of the class consisting of hydrogen and carbobenzoxy and R is a member of the class consisting of hydrogen, lower alkyl, phenyl, cinnamyl, benzyl and chlorobenzhydryl, which comprises reacting a compound of the formula:

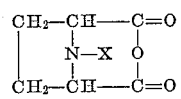

wherein X has the above significance, with an excess of an amine of the formula $NH_2R$ wherein R has the above significance, in an inert anhydrous organic solvent and refluxing the obtained monoamide with acetic anhydride.

14. A compound of the formula:

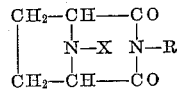

wherein X is a member of the class consisting of hydrogen and carbobenzoxy and R is a member of the class consisting of hydrogen, lower alkyl, phenyl, cinnamyl, benzyl and chlorobenzhydryl.

15. 3-phenyl-8carbobenzoxy-3,8-diazabicyclo-[3,2,1]-octane-2,4-dione.
16. 3-methyl-8-carbobenzoxy-3,8-diazabicyclo-[3,2,1]-octane-2,4-dione.
17. 3-butyl-8-carbobenzoxy-3,8-diazabicyclo-[3,2,1]-octane-2,4-dione.
18. A process of preparing a 3,8-diazabicyclo [3,2,1]-octane of the formula

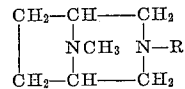

wherein R is a member of the class consisting of hydrogen, lower alkyl, phenyl, cinnamyl, benzyl and chlorobenzhydryl, which comprises reducing a 3,8-diazabicyclo-[3,2,1]-octane-2,4-dione of the formula

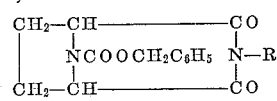

wherein R has the above significance, with lithium aluminum hydride in an anhydrous organic solvent.

References Cited by the Examiner

Barnes et al.: Journal American Chemical Society, volume 75, No. 4, pages 975–977 (1953).

Blackman et al.: Journal Organic Chemistry, volume 26, pages 2750–2755 (1961).

Cignarella et al.: Gazzetta Chima Ital., volume 90, pages 1495–1504 (1960).

From a thesis submitted by S. W. Blackman to the School of Graduate Study of the Polytechnic Institute of Brooklyn in partial fulfillment of the requirements for the degree of Doctor of Philosophy, June 1960.

Richter: Organic Chemistry, volume 3, pages 3–5 (1923).

Robinson et al.: Chemical Society Journal, London, pt. 2, pages 2485–2487 (1932).

Schipper et al.: Journal Organic Chemistry, volume 26, pages 3599–3602 (1961).

NICHOLAS S. RIZZO, *Primary Examiner.*

IRVING MARCUS, WALTER A. MODANCE,
*Examiners.*